US012703618B2

(12) United States Patent
Alinari et al.

(10) Patent No.: US 12,703,618 B2
(45) Date of Patent: Aug. 11, 2026

(54) FORKLIFT EQUIPMENT FOR MOVING WORKSHOP LOADS

(71) Applicant: NUOVO PIGNONE TECNOLOGIE - SRL, Florence (IT)

(72) Inventors: Giacomo Alinari, Florence (IT); Marco Baldassarri, Florence (IT)

(73) Assignee: Nuovo Pignone Tecnologie - S.r.l., Florence (IT)

( * ) Notice: Subject to any disclaimer, the term of this patent is extended or adjusted under 35 U.S.C. 154(b) by 239 days.

(21) Appl. No.: 18/547,458

(22) PCT Filed: Feb. 23, 2022

(86) PCT No.: PCT/EP2022/025061

§ 371 (c)(1),
(2) Date: Aug. 22, 2023

(87) PCT Pub. No.: WO2022/179752

PCT Pub. Date: Sep. 1, 2022

(65) Prior Publication Data

US 2024/0132333 A1 Apr. 25, 2024
US 2024/0228249 A9 Jul. 11, 2024

(30) Foreign Application Priority Data

Feb. 23, 2021 (IT) ........................ 102021000004190

(51) Int. Cl.
*B66F 9/18* (2006.01)

(52) U.S. Cl.
CPC ...................................... *B66F 9/18* (2013.01)

(58) Field of Classification Search
None
See application file for complete search history.

(56) References Cited

U.S. PATENT DOCUMENTS 3,050,206 A * 8/1962 Mccracken ............... B66F 9/12 414/607
3,599,818 A 8/1971 Stanton
3,602,368 A * 8/1971 Gould ................... F17C 13/084 211/85.18
3,791,544 A 2/1974 Moses
3,930,585 A * 1/1976 Lynch ....................... B66F 9/18 248/339
4,662,669 A * 5/1987 Erickson .................. B01J 19/00 294/68.27
4,688,981 A * 8/1987 Ravnsborg ................ B66F 9/12 414/785

(Continued)

FOREIGN PATENT DOCUMENTS

CN 206188062 U 5/2017
CN 207016422 U 2/2018

(Continued)

*Primary Examiner* — Mark C Hageman
(74) *Attorney, Agent, or Firm* — Paul Frank + Collins P.C.

(57) ABSTRACT

Forklift equipment for moving a load by a forklift truck is disclosed. The forklift equipment comprises a frame, a coupling group comprising a first and a second housing for the insertion or extraction of a relevant first and second fork of the forklift truck, and a supporting member, arranged below the plane defined by the first and the second housing to allow the lifting of the load by the forklift truck.

7 Claims, 2 Drawing Sheets

(56) References Cited

U.S. PATENT DOCUMENTS

| | | | | |
|---|---|---|---|---|
| 4,881,866 | A * | 11/1989 | Harmon | B65G 49/062 187/233 |
| 5,078,415 | A * | 1/1992 | Goral | F17C 13/085 414/537 |
| 6,318,568 | B1 * | 11/2001 | Mc Cord | F17C 13/084 211/85.18 |
| 8,894,037 | B1 * | 11/2014 | Brauer | B65D 19/0038 254/2 C |
| 9,371,685 | B2 * | 6/2016 | Cooper | E06B 7/28 |
| 10,556,783 | B2 | 2/2020 | Ivey | |
| 2001/0038788 | A1 * | 11/2001 | Robinson | B66F 9/18 414/607 |
| 2007/0183882 | A1 | 8/2007 | Salazar | |
| 2008/0175700 | A1 | 7/2008 | Mcgrane et al. | |
| 2020/0207396 | A1 * | 7/2020 | Espy | B62B 5/0003 |

FOREIGN PATENT DOCUMENTS

| | | | |
|---|---|---|---|
| EP | 1541521 | A1 | 6/2005 |
| JP | 2005075642 | A | 3/2005 |
| KR | 20130108873 | A | 10/2013 |

* cited by examiner

FORKLIFT EQUIPMENT FOR MOVING WORKSHOP LOADS

TECHNICAL FIELD

The present disclosure concerns forklift equipment for moving and transporting workshop loads or machinery, such as drawers, cabinets or lockers, wherein the forklift equipment is couplable with a forklift truck, or a vehicle in general, for lifting and moving loads.

BACKGROUND ART

In warehouses and manufacturing and distribution centers, it is often required to transport loads such as materials, goods, but also workshop equipment or machinery over short and long distances.

Usually, the transportation of goods can be carried out either manually or automatically, by using forklift trucks and the like. A forklift truck is an industrial vehicle having two power-operated horizontal forks, that can be raised and lowered for loading, transporting, and unloading loads.

In the case of transportation of goods by a forklift truck, the goods can typically be loaded and/or unloaded from the forklift truck manually by the operator. In particular, during the loading step, the operator places the goods on top of platforms, such as wooden pallets and the like, while, during the unloading step, the operator has to unload them from the forklift truck.

However, currently, when workshop equipment or machineries, such as a workshop drawer or cabinet, needs to be moved, for instance, within the warehouse, this is done only manually by an operator, who pushes directly the workshop equipment in a desired direction, by moving it from its original position.

Therefore, such equipment cannot be transported over long distances since this would require a considerable amount of effort and time for the operator, along with a high risk of injuries. In fact, due to the typical weight and size of the workshop equipment, the manual handling of such equipment often leads to risks of injury for the operator.

SUMMARY

In one aspect, the subject matter disclosed herein is directed to forklift equipment for moving a load, such as workshop equipment, such as a drawer, a locker, or a cabinet, by a forklift truck. The forklift equipment comprises a frame, and a coupling group, connected to the frame. The coupling group comprises a first housing and a second housing, parallel arranged, into which the forks of the forklift truck can be inserted, to allow moving the forklift equipment. The first housing and the second housing defines a plane. The forklift equipment comprises also a supporting member, connected to the frame, for supporting the load. The supporting member is arranged between the first housing and the second housing of the coupling group and below the plane defined by the first housing and the second housing of the coupling group.

In another aspect, the subject matter disclosed herein concerns that the supporting member has one end comprising a safety edge, to prevent the load from sliding along the direction of the supporting member.

In another aspect, disclosed herein is that the frame comprises a main portion, a front portion, and a rear portion. The front portion is connected to the first housing and the second housing, defining an opening, which allows the load to be introduced into the forklift equipment. The rear portion has one end connected to the first portion and the other end connected to the main portion. Also, the front portion and the rear portion of the frame define a containment volume, in which the load can be contained.

In another aspect, the subject matter disclosed herein is directed to a method of moving a load with forklift equipment couplable with a forklift truck, where the inserting of the forks of the forklift truck through the relevant first housing and second housing of the forklift equipment is carried out. Then, the forklift equipment is positioned in correspondence with the load to be moved, and the supporting member of the forklift equipment is placed underneath the load. Finally, the forklift equipment is raised with the forklift truck for lifting the load from the ground.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

In warehouses or manufacturing and distribution centers, goods have to be moved either manually or automatically. The transportation of workshop equipment or loads, such as drawers, cabinets, or lockers, requires manual handling by an operator. Thus, a considerable amount of effort and time of the same operator is needed. The present subject matter is directed to equipment for moving and transporting workshop loads, wherein the equipment is removably couplable with a forklift truck, or a vehicle in general, for lifting and moving the loads, avoiding it to fall on the ground. In this way, the workshop loads can be safely transported over long distances.

Figure 1:
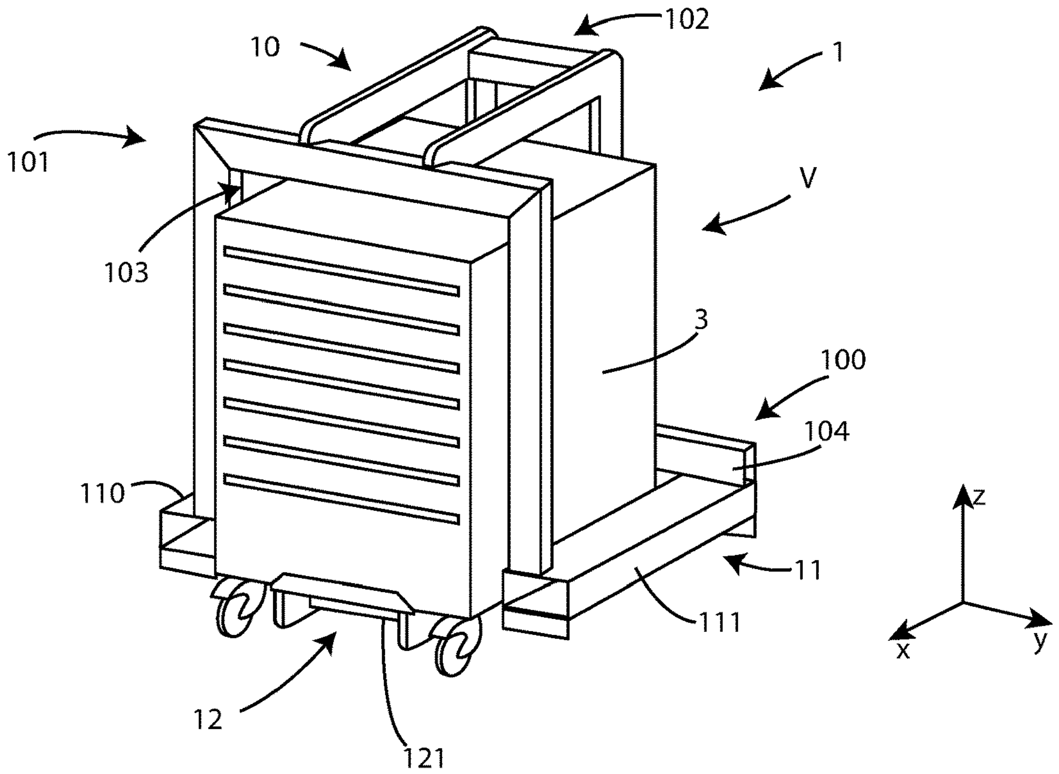
FIG. 1 illustrates a perspective view of a forklift equipment housing a load according to a first embodiment.

Referring now to the drawings, FIG. 1 shows an embodiment of a forklift equipment, indicated with reference number 1, to be coupled to a forklift truck 2. The forklift equipment 1 comprises a frame 10, a coupling group 11, connected to the frame 10, and a supporting member 12, which is connected to the coupling group 11, as better specified below.

According to the present disclosure, the forklift equipment 1 is a frame with a cross-section of a rectangular parallelepiped. However, in some embodiments, the cross-section of the forklift equipment 1 may be different. Hereafter, for ease of reference only, the forklift equipment 1 may also be referred to as equipment 1.

Figure 2:
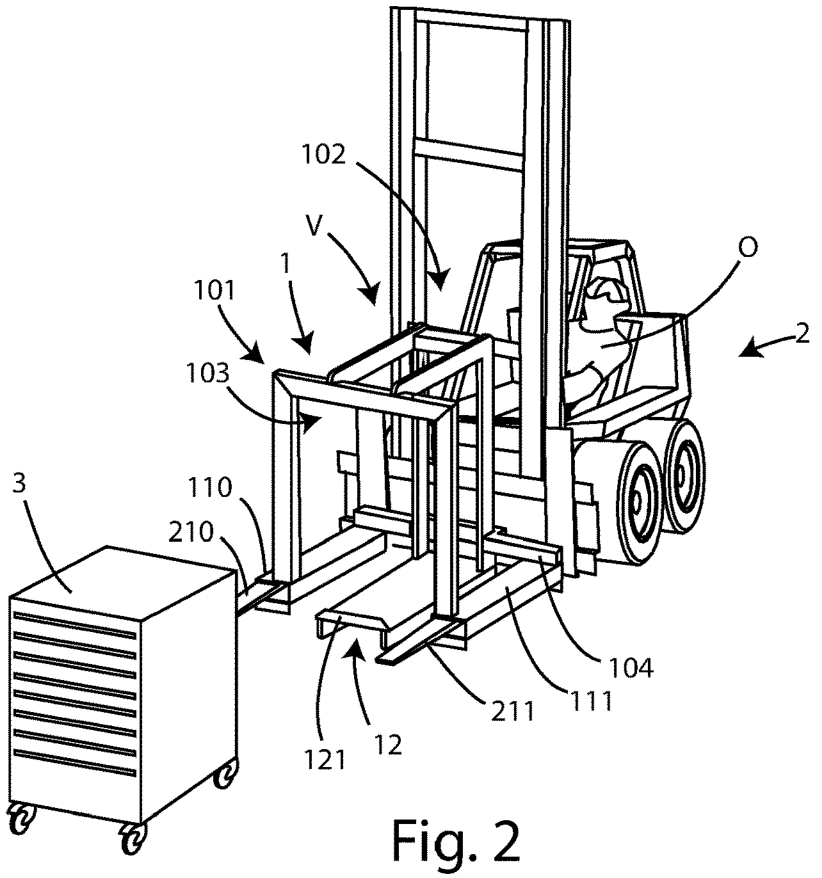
FIG. 2 illustrates a perspective view of the forklift equipment of FIG. 1 coupled to a forklift truck and the load to be housed in the forklift equipment.
Figure 3:
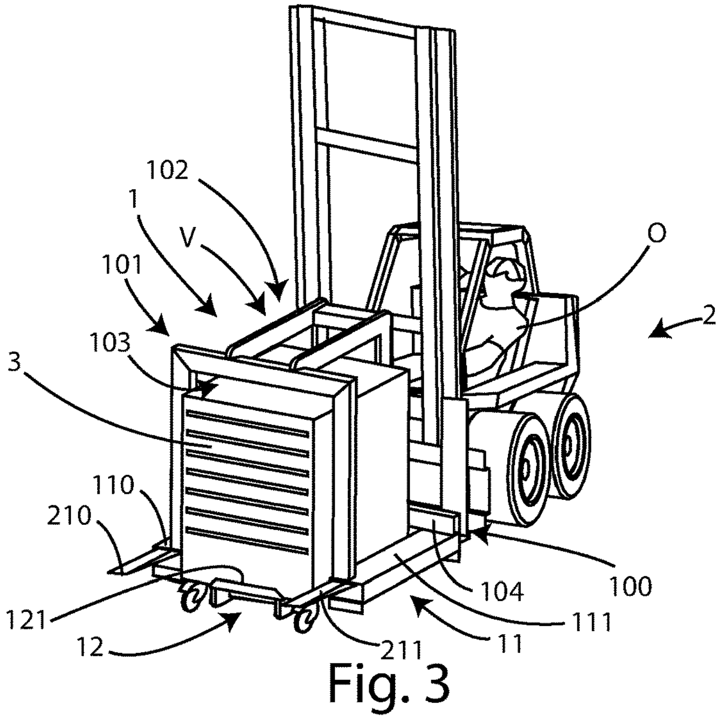
FIG. 3 illustrates a perspective view of the forklift equipment of FIG. 1, which is coupled to a forklift truck and houses the load.

As shown in FIGS. 1, 2, and 3, the frame 10 comprises a main portion 100, a front portion 101, and a rear portion 102, which is connected to the front portion 101.

The main portion 100 is connected to the rear portion 102 of the frame 10. In particular, the main portion 100 comprises a connecting beam 104, which is open at its ends and it develops along a direction parallel or substantially parallel to an axis Y of a Cartesian reference system XYZ (shown in FIG. 1).

The front portion 101 defines an opening 103 which allows workshop equipment or load 3, such as a cabinet, drawer, or locker, to be introduced into the forklift equipment 1. However, also other loads or workshop machinery may be introduced into the equipment 1. In the present embodiment, the front portion 101 has a substantially rectangular shape. However, in some other embodiments, the shape of the front portion 101 may be different.

The rear portion 102 has one end connected to the front portion 101, and the other end connected to the main portion 100. According to the present disclosure, the rear portion 102 is substantially L-shaped. However, in other embodiments, the shape of the rear portion 102 may be different. Furthermore, both portions 101, 102 of the frame 10 define a containment volume V, in which load 3 can be contained.

The coupling group 11 comprises a first housing 110 and a second housing 111, arranged parallel to each other. The housings 110, 111 have one end connected to the front portion 101 of the frame 10 and the other end connected to the main portion 100 of the frame 10.

According to the present disclosure, the housings 110, 111 are hollow through beams, to allow the insertion through each one of them of a relevant fork 210, 211 of the forklift truck 2. More specifically, the first housing 110 is open at its ends allowing the insertion or extraction of the first fork 210 of the forklift truck 2. Similarly, the second housing 111 is open at its ends allowing the insertion or extraction of the second fork 211 of the forklift truck 2.

In particular, each housing 110, 111 develops along a direction parallel or substantially parallel to an axis X of the Cartesian reference system XYZ mentioned above, i.e., perpendicular to the direction of the connecting beam 104 of the main portion 100. Also, in the present embodiment, the two housings 110, 111 have the same lengths, but, in some other embodiments, they may have different lengths compared to each other.

Furthermore, the two housings 110, 111 define a plane parallel or substantially parallel to the plane XY of the Cartesian reference system XYZ shown in FIG. 1.

As shown in FIG. 2 and FIG. 3, the first housing 110 and the second housing 111 allow the coupling between equipment 1 and the forklift truck 2, in such a way that equipment 1 can be transported, lifted, or lowered by the forklift truck 2.

The supporting member 12 is connected to frame 10 and it develops along a direction parallel to the first 110 and second 111 housing, i.e., parallel or substantially parallel to the axis X of the same Cartesian reference system XYZ mentioned above.

According to the present disclosure, the supporting member 12 is arranged between the first 110 and second 111 housing. In particular, the supporting member 12 lies on a different plane as compared to the plane defined by the two housings 110, 111. However, in some other embodiments, the supporting member 112 may be located in other positions.

With particular reference to FIG. 2, the distance between the supporting member 12 and the ground is lower than the distance between the two housings 110, 111, and the ground. This allows the supporting member 12 to be positioned underneath the load 3 while being enclosed by the frame 10 of equipment 1.

Furthermore, the supporting member 12 has one end 120 shaped in such a way as to allow the supporting member 12 to prevent the load 3 from falling to the ground. In particular, in the present embodiment, the end 120 has a safety edge or edge 121 that prevents the load 3 from moving along the direction of the X-axis, namely to slide, during the loading, the transportation, or the unloading of the load 3 by the forklift truck 2.

The forklift equipment 1 operates as follows.

Figure 4:
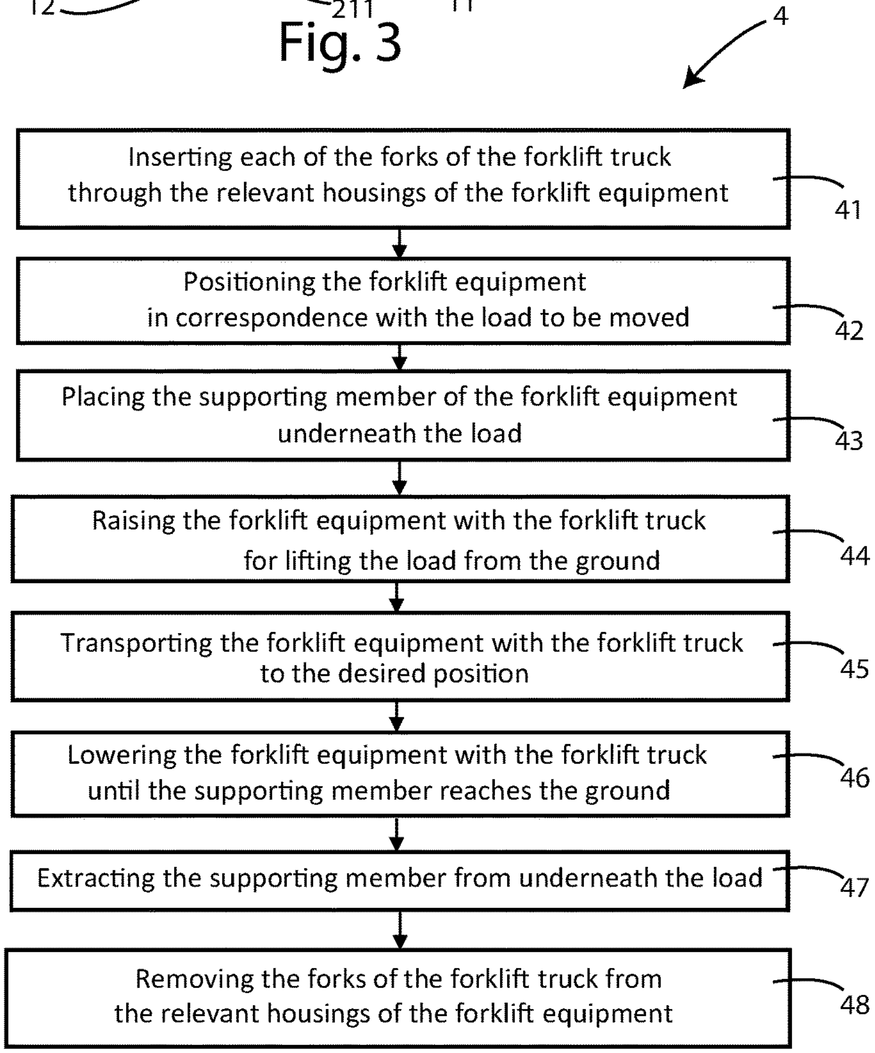
FIG. 4 illustrates a flowchart of a method of moving the load with the forklift equipment couplable to the forklift truck, according to a first embodiment.

More specifically, referring to FIG. 4, according to the present disclosure, the flowchart of a method 4 of moving the load 3 with the forklift equipment 1 is shown.

At first, equipment 1 is coupled with the forklift truck 2. In fact, when the load 3, such as the drawer shown in FIG. 1, 2, or 3, has to be moved, the first fork 210 and the second fork 211 of the forklift truck 2 are inserted (step 41) in the first housing 110 and second housing 111 respectively. In particular, an operator O drives the forklift truck 2 in such a way as to insert the forks 210, 211 into the respective housings 110, 111. In this way, the forklift truck 2 can move the forklift equipment 1 over long distances, if necessary, by raising and/or lowering it.

Then, the forklift equipment 1 is positioned (step 42) in correspondence with the load 3 to be transported. Subsequently, the operator O drives the forklift truck 2 to place (step 43) the supporting member 12 underneath the load 3.

Furthermore, the forklift equipment 1 is raised (step 44) by lifting the forks 210, 211 of the forklift truck 2 just enough for lifting the load 3 from the ground. Therefore, the load 3 is prevented from sliding and then falling from the forklift equipment 1 due to the presence of the safety edge 121 of the supporting member 12.

In particular, the operator O controls the forklift truck 2 for lifting or lowering the forks 210, 211 and, thus, the forklift equipment 1, which contains the load 3, with respect to its original position.

Then, the operator O drives the forklift truck 2 for transporting (step 45) the forklift equipment 1 containing the load 3 over short or long distances to the desired position.

Once the desired position has been reached, the forks 210, 211 are lowered (step 46) by the forklift truck 2 driven by the operator O until the load 3, and, then, the supporting member 12, reach the ground.

Subsequently, the supporting member 12 is extracted (step 47) from underneath the load 3. Therefore, the load 3 is no longer contained within equipment 1.

Finally, equipment 1 is decoupled from the forklift truck 2 by removing (step 48) the forks 210 and 211 of the forklift truck 2 from the first housing 110 and second housing 111 respectively.

An advantage of the present disclosure is that thanks to the use of the forklift equipment, the workshop equipment can be transported over long distances, reducing the amount of effort and time for the operator.

Another advantage of the present disclosure is the reduction of risks of injury for the operator since any manual handling of the workshop equipment by the operator is avoided.

While aspects of the invention have been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A forklift equipment for moving a load by a forklift truck equipped with a first fork and a second fork, comprising:

a frame; and a coupling group connected to the frame, the coupling group comprising, a first housing and a second housing, each being hollow to receive the first fork and second fork of the forklift truck, respectively, the first housing and the second housing defining a plane, and a supporting member connected to the frame and residing between the first housing and the second housing, the supporting member having a top surface that is below the plane defined by the first housing and the second housing and side surfaces spaced apart from both the first housing and the second housing, wherein the frame comprises:

a main portion, a front portion connected to the first housing and the second housing that defines an opening to receive the load into the forklift equipment, and a rear portion having one end connected to the front portion and the other end connected to the main portion.

2. The forklift equipment of claim 1, further comprising: a safety edge coupled to the supporting member.

3. The forklift equipment of claim 1, wherein the frame has a substantially rectangular shape.

4. The forklift equipment of claim 1, wherein the frame comprises a connecting beam that is perpendicular to the first housing and the second housing.

5. The forklift equipment of claim 1, wherein the first housing and the second housing are hollow through beams.

6. The forklift equipment of claim 1, further comprising: a safety edge coupled to the supporting member, the safety edge extending upwardly in relation to the top of the supporting member.

7. The forklift equipment of claim 1, wherein the frame has a rear portion that is substantially L-shaped.

* * * * *